United States Patent
Cho

(10) Patent No.: US 9,524,430 B1
(45) Date of Patent: Dec. 20, 2016

(54) METHOD FOR DETECTING TEXTS INCLUDED IN AN IMAGE AND APPARATUS USING THE SAME

(71) Applicant: StradVision, Inc., San Jose, CA (US)

(72) Inventor: Hojin Cho, Gyeongsangbuk-do (KR)

(73) Assignee: StradVision Korea, Inc., Pohang, Gyeongbuk (KR)

( * ) Notice: Subject to any disclaimer, the term of this patent is extended or adjusted under 35 U.S.C. 154(b) by 0 days.

(21) Appl. No.: 15/014,441

(22) Filed: Feb. 3, 2016

(51) Int. Cl.
  *G06K 9/62* (2006.01)
  *G06K 9/00* (2006.01)
  *G06K 9/46* (2006.01)

(52) U.S. Cl.
  CPC ............. *G06K 9/00456* (2013.01); *G06K 9/46* (2013.01); *G06K 9/6202* (2013.01); *G06K 9/6218* (2013.01); *G06K 9/6282* (2013.01); *G06T 2210/12* (2013.01)

(58) Field of Classification Search
  None
  See application file for complete search history.

(56) References Cited

U.S. PATENT DOCUMENTS

| | | | | |
|---|---|---|---|---|
| 2003/0026480 A1* | 2/2003 | Karidi | ................ | G06K 9/00456 382/176 |
| 2004/0202349 A1* | 10/2004 | Erol | .................. | G06F 17/30256 382/100 |
| 2007/0116360 A1* | 5/2007 | Jung | .................... | G06K 9/3233 382/176 |
| 2009/0285482 A1* | 11/2009 | Epshtein | ............ | G06K 9/00463 382/176 |
| 2011/0091098 A1* | 4/2011 | Yuille | .................... | G06K 9/325 382/159 |
| 2011/0158532 A1* | 6/2011 | Chung | ................. | G06K 9/3258 382/176 |
| 2012/0224765 A1* | 9/2012 | Kim | ........................ | G06K 9/325 382/159 |
| 2015/0039637 A1* | 2/2015 | Neuhauser | ......... | G06Q 30/0201 707/758 |

* cited by examiner

*Primary Examiner* — Stephen R Koziol
*Assistant Examiner* — Delomia L Gilliard
(74) *Attorney, Agent, or Firm* — Husch Blackwell LLP

(57) ABSTRACT

A method for detecting texts included in an image is disclosed. The method includes steps of: (a) detecting at least one text candidate in an inputted image by referring to feature values of pixels in the inputted image; (b) classifying (i) the detected text candidate as a strong text or a non-strong text by referring to a comparison result between a first threshold value and a first feature value and (ii) the text candidate classified as the non-strong text as a weak text or a non-text by referring to a comparison result between a second threshold value and a second feature value; and (c) determining whether to classify the weak text as the strong text by referring to information on the strong text and information on the weak text.

24 Claims, 10 Drawing Sheets
(4 of 10 Drawing Sheet(s) Filed in Color)

INPUT IMAGE

ERs AFTER NON-MAXIMUM SUPPRESSION

TEXTS CLASSIFIED WITH HIGH THRESHOLD

TEXTS CLASSIFIED WITH LOW THRESHOLD

HYSTERESIS BASED TRACKED TEXTS

RESULTS

FIG. 6

| METHOD | NO. OF CANDIDATES | RECALL (%) |
|---|---|---|
| All ERs | 6,051,331 | 96.6 |
| MSERs | 39,762 | 53.9 |
| SUNG et al.<br>INITIAL ERs<br>REFINED ERs | <br>1,729,833<br>93,357 | <br>89.6<br>87.7 |
| OUR METHOD<br>ERs AFTER NMS<br>FINAL CHARACTERS | <br>629,932<br>8,121 | <br>95.1<br>87.4 |

FIG. 7

| METHOD | RECALL | PRECISION | HMEAN |
|---|---|---|---|
| OUR METHOD | 78.45 | 86.26 | 82.17 |
| SUNG et al. | 74.23 | 88.65 | 80.80 |
| TIAN et al. | 75.89 | 85.15 | 80.25 |
| YIN et al. | 66.45 | 88.47 | 75.89 |
| NEUMANN AND MATAS | 64.84 | 87.51 | 74.49 |
| YIN et al. | 65.11 | 83.98 | 73.35 |
| BAI et al. | 68.24 | 78.89 | 73.18 |
| SHI et al. | 62.85 | 84.70 | 72.16 |

FIG. 8

| METHOD | RECALL | PRECISION | HMEAN |
|---|---|---|---|
| PAN et al. | 65.9 | 64.5 | 65.5 |
| BASELINE | 67.2 | 78.6 | 72.4 |
| YIN et al. | 68.5 | 82.6 | 74.6 |
| TIAN et al. | 78.4 | 84.7 | 81.4 |
| OUR METHOD | 93.5 | 93.1 | 93.3 |

# METHOD FOR DETECTING TEXTS INCLUDED IN AN IMAGE AND APPARATUS USING THE SAME

FIELD OF THE INVENTION

The present invention relates to a method and an apparatus for detecting texts included in an image; and more particularly, to the method and the apparatus for detecting or allowing other device to detect at least one text candidate in an inputted image by referring to feature values of pixels in the inputted image; classifying or allowing other device to classify (i) the detected text candidate as a strong text or a non-strong text by referring to a comparison result between a first threshold value and a first feature value of at least one pixel selected within a corresponding region where the detected text candidate is included or a value converted from the first feature value, and (ii) the text candidate classified as the non-strong text as a weak text or a non-text by referring to a comparison result between a second threshold value and a second feature value of at least one pixel selected within a corresponding region where the text candidate classified as the non-strong text is included or a value converted from the second feature value; and determining whether to classify or allow other device to classify the weak text as the strong text by referring to information on the strong text and information on the weak text.

BACKGROUND OF THE INVENTION

In many cases, as texts in an image provide significant information, detecting and recognizing scene texts has been considered importantly in a variety of applications for computer vision such as image and video retrieval, multi-language translator, and automotive assistance.

A scene text detection algorithm as an algorithm for detecting a text (or a character) in an image may be largely divided into a sliding window method and a connected component analysis method depending on a scheme for extracting text candidates.

The sliding window method is a technique for detecting texts of a scene image by shifting a window in multiple scales at all locations of the image. Thanks to thorough searches for an inputted image, this technique has the advantage of high recall rates showing how many text regions are detected. Contrarily, it cannot avoid too many calculations caused by scanning the window thoroughly and may cause a lot of false positive results due to a great number of text candidates. Accordingly, it is inappropriate for real-time applications. The sliding window method has been introduced in an article entitled "Detecting and reading text in natural scenes" in Proc. CVPR 2004 on pages 366-373 in 2004 by X. Chen and A. L. Yuille, etc.

As such, as the sliding window method requires a lot of calculations, the connected component analysis method is recently used more frequently. It is a method for extracting text candidates as a set of pixels which share similar text characteristics from an inputted image and performing work for refining text candidates to suppress non-text candidates. The stroke width transform (SWT) and the maximally stable extremal regions (MSER) are representative techniques of the connected component analysis method. These methods provide state-of-the-art performance with regard to the detection of the scene texts. The connected component analysis method has been introduced in an article entitled "Detecting text in natural scenes with stroke width transform" in Proc. CVPR 2010 on pages 2963-2970 in 2010 by B. Epshtein, E. Ofek, and Y. Wexler, etc.

However, general constraints used to refine text candidates under the connected component analysis method have drawbacks of being limitedly evaluated upon detecting several true texts and consequentially showing low recall rates.

Accordingly, text detection techniques that may show high recall rates while making optimal performance are being required upon detecting texts from images.

SUMMARY OF THE INVENTION

It is an object of the present invention to solve all the aforementioned problems.

It is another object of the present invention to provide a text detection technique with high recall rates even while making optimal performance.

It is still another object of the present invention to provide a text detection technique with high recall rates by classifying text candidates as strong texts, weak texts, or non-texts in use of multiple thresholds.

It is still yet another object of the present invention to provide a text detection technique with high recall rates by classifying text candidates as strong texts and weak texts and then changing the weak texts to the strong texts by referring to at least part of information on locations, sizes, colors, and stroke widths of the strong texts and the weak texts.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The above and other objects and features of the present invention will become apparent from the following description of preferred embodiments given in conjunction with the accompanying drawings, in which:

FIGS. 6 to 8 are tables illustrating results of comparative experiments of performances between the present invention and other text detection techniques.

Figure 1:
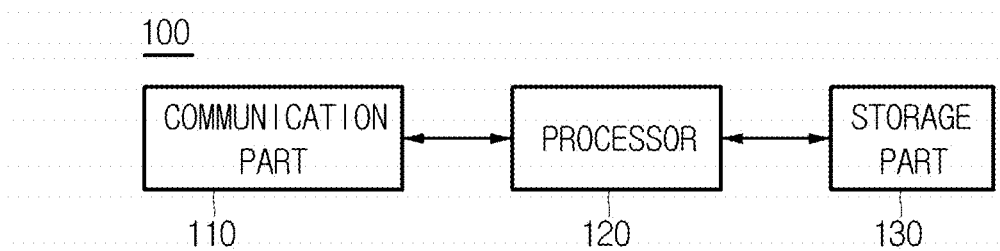
FIG. 1 is a block diagram illustrating a configuration of an apparatus for detecting a text included in an image in accordance with one example embodiment of the present invention.

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention suggests a text detection technique considering criteria as shown below. The present inventor calls a detector in accordance with the present invention Canny Text Detector. Explanation on the configuration of the present invention to satisfy each of the criteria as shown below will be made in details.

1. Recall: Text detection should localize as many text regions as possible.

2. Precision: The detection results should not contain non-text regions, if possible.

3. Uniqueness: Each detected character should be marked only once.

4. Compactness: The detected region (bounding box) should accurately localize its corresponding character to minimize extra margin.

Figure 2:
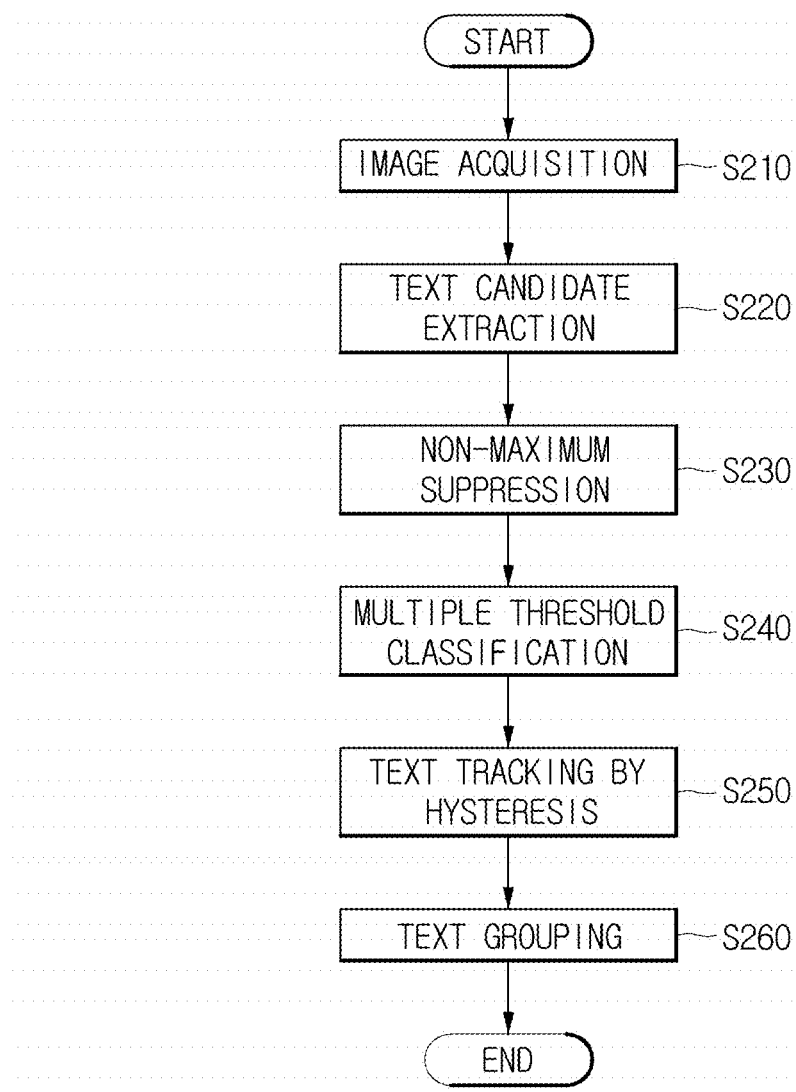
FIG. 2 is a flowchart showing a process of an apparatus detecting a text included in an image in accordance with one example embodiment of the present invention.

FIG. 1 is a block diagram illustrating a configuration of an apparatus for detecting a text included in an image in accordance with one example embodiment of the present invention and FIG. 2 is a flowchart showing a course of the apparatus detecting a text included in an image in accordance with one example embodiment of the present invention.

By referring to FIG. 1, the apparatus 100 for detecting a text included in an image in accordance with one example embodiment of the present invention includes a communication part 110, a processor 120, and a storage part 130.

The communication part 110 has a configuration for transmitting and receiving data to/from external devices or among internal components. In particular, the communication part 110 may acquire an inputted image for detecting a text at a step of S210.

The processor 120 has a configuration of performing various operations with regard to a variety of data. First of all, the processor 120 may detect or allow other device to detect at least one text candidate from an inputted image, if being acquired, by referring to feature values of pixels included in the inputted image at a step of S220.

At the time, if the feature values of all pixels included in a specific region in the inputted image are larger than those in the outer boundary pixels of the specific region, the processor 120 may detect or allow other device to detect the specific region as one text candidate.

Mathematically, it is defined as follows:

$$R_t = (\{x | I(x) > I(y) \forall x \in R_t, \forall y \in B(R_t)\}) \qquad \text{<Mathematical Equation 1>}$$

where x and y are pixel indices of a given single channel I, t is a threshold value used for extracting the text candidate region, and $B(R_t)$ is the set of boundary pixels of $R_t$. Of course, in the reverse case, if the feature values of all pixels included in a specific region in the inputted image are smaller than those in the outer boundary pixels of the specific region, the processor 120 may detect or allow other device to detect the specific region as one text candidate.

Next, it would be also possible to build an ER tree by using extremal regions (ERs). In short, the processor 120 may detect or allow other device to detect the at least one text candidate while changing the intensity levels of the pixels of the specific region and may also do, or allow other device to do, build a tree by allocating (i) a low-level text candidate whose intensity level of the pixel of the specific region is relatively high and (ii) a text candidate whose intensity level of the pixel of the specific region is the highest among high-level text candidates, including a region of the low-level text candidate respectively, whose intensity level of the pixel of the specific region is relatively low, to a child node and a parent node, respectively.

Figure 3:
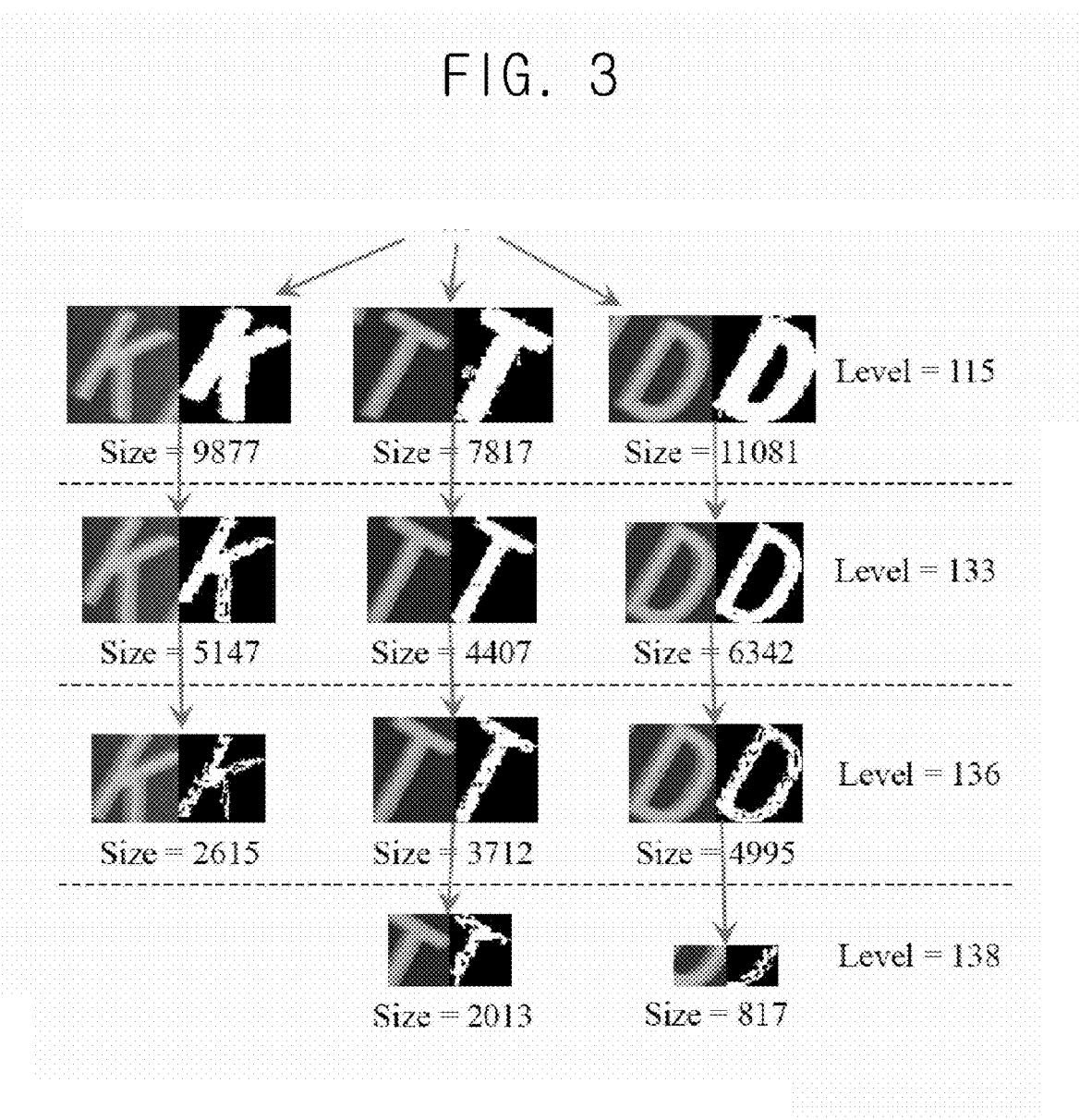
FIG. 3 is a diagram illustrating an example of an ER tree in accordance with one example embodiment of the present invention.

FIG. 3 is a diagram illustrating an example of an ER tree in accordance with one example embodiment of the present invention.

In the example illustrated in FIG. 3, it can be found that a text candidate with the intensity level of 136 and a text candidate with the intensity level of 133 including a region of the text candidate with the intensity level of 136 are allocated, respectively, to a child node and a parent node of the ER tree.

Next, the processor 120 may perform or allow other device to perform multiple threshold classification at a step of S240. In other words, the processor 120 may classify or allow other device to classify the detected text candidate as a strong text or a non-strong text by referring to a comparison result between a first threshold value and a first feature value of at least one pixel selected within a corresponding region where the detected text candidate is included or a value converted from the first feature value and then classify or allow other device to classify the text candidate classified as the non-strong text as a weak text or a non-weak text by referring to a comparison result between a second threshold value and a second feature value of at least one pixel selected within a corresponding region where the text candidate classified as the non-strong text is included or a value converted from the second feature value. For example, the processor 120 may classify or allow other device to classify the detected text candidate by using an AdaBoost-type classifier.

Herein, the region where the detected text candidate is included may be a bounding box area including the detected text candidate with the extra margin minimized.

In addition, a strong text means a detected text candidate which has a relatively high possibility of being determined as a real text. Contrarily, a weak text means a detected text candidate which has a relatively low possibility of being determined as a real text in comparison with the strong text and a non-text means a detected text candidate which has an extremely low possibility of being determined as a real text.

Besides, the first threshold value may be a high one and the second threshold value may be a low one. The different threshold values may give degrees of precision differently. For example, the first and the second threshold values may give a degree of precision of 99% and that of 90%, respectively. As such, the second threshold value may show lower degree of precision compared to the first threshold value but may show relatively higher recall rates.

Besides, the processor 120 may perform or allow other device to perform the classification by referring to a value converted from the feature value of the pixel selected in the region where the detected text candidate is included by using a mean local binary pattern (MLBP).

Figure 4:
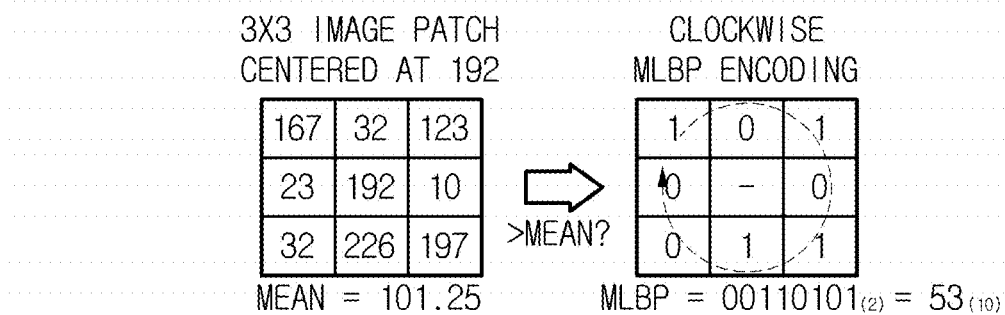
FIG. 4 is a diagram illustrating an example of MLBP encoding.

FIG. 4 is a diagram illustrating an example of MLBP encoding.

By referring to FIG. 4, the average value of 8-connected neighbor pixels (neighbor patches in a 3×3 patch) around the selected pixel in the region where the detected text candidate is included is first calculated. If a value of a preset neighbor pixel is larger than the average value of the 8-connected neighbor pixels, 1 is allocated to the preset pixel, otherwise 0. Then, the values allocated as mentioned above may be read clockwise from the left-top neighbor pixel. Accordingly, the values are regarded as an encoded number, i.e., binary numbers consisting of 8 bits. In an example illustrated in FIG. 4, it can be found that the MLBP value is $00110101_{(2)}$ as binary numbers. However, the features available in the present invention are not limited to the MLBP but a variety of other features could be used.

Meanwhile, text candidates could be classified by being compared with two threshold values over two steps (this will be referred to as double threshold classification) but classification could be also made over more than two steps. In other words, there may be at least one middle threshold value between the first and the second threshold values, in which case, the processor 120 may classify or allow other device to classify (ii-1) a text candidate classified as a non-strong text as the strong text or a subordinated weak text by comparing with the middle threshold value and (ii-2) the subordinated weak text candidate as the weak text or the non-text by comparing with the second threshold value.

The processor 120 may perform or allow other device to perform non-maximum suppression at a step of S230 before the multiple threshold classification.

In short, if multiple text candidates are detected, the processor 120 may identify at least one text candidate set including a text candidate which overlaps by no less than a certain percentage among respective regions where the detected multiple text candidates are included and select or allow other device to select a text candidate satisfying a predetermined condition among the identified text candidate set. In this case, the processor 120 may classify or allow other device to classify (i) the text candidate satisfying the predetermined condition as the strong text or the non-strong text by referring to the comparison result between the first threshold value and the first feature value of at least one pixel selected within the corresponding region including the text candidate satisfying the predetermined condition or the value converted from the first feature value and (ii) the text candidate classified as the non-strong text as the weak text or the non-text by referring to the comparison result between the second threshold value and the second feature value of at least one pixel selected within the corresponding region including the text candidate classified as the non-strong text or the value converted from the second feature value.

As shown above, the overlaps among the regions where text candidates are included sometimes appear in maximally stable extremal regions (MSERs) and ERs. To guarantee the Uniqueness criterion as for an ER tree, it would be possible to suppress repeated ERs (or nodes) and select only one ER with the maximum stability.

The course of non-maximum suppression are explained in more details as follows:

Upon building an ER tree, (a) for a particular node in the ER tree as stated above, if there occurs no less than a certain percentage of an overlap between a first region where a text candidate corresponding to the particular node is included and a second region, including the first region, where a text node, with a relatively low intensity level of the pixel of the specific region, corresponding to a parent node is included for no less than a specified number of times, (b) the processor 120 may select or allow other device to select a text candidate corresponding to a node whose variant of a region where a text candidate is included is relatively smallest compared to its preset parent node.

To determine (a), the following formula may be used:

$$O(R_{t-k}, R_t) = \frac{|R_t|}{|R_{t-k}|} \qquad \langle\text{Mathematical Equation 2}\rangle$$

where $R_{t-k}$ is the parent of $R_t$ in the ER tree, and $|R|$ denotes the bounding box area of R (a region where the text candidate is included).

For example, (b) may be performed if $O(R_{t-k}, R_t) > 0.7$ for no less than five times. (b) may mean that the ER with the highest stability is selected and the stability may be expressed as shown in the mathematical equation below.

$$S(R_t) = \frac{(|R_{t-k}| - |R_t|)}{|R_t|} \qquad \langle\text{Mathematical Equation 3}\rangle$$

where it could be set as k=2. In this case, the stability could be considered for the particular node and its grandparent node.

For reference, if there exist two or more ERs with the same stability, an ER with the smallest region (bounding box area) could be selected. Through these, both Uniqueness and Compactness criteria could be satisfied.

Besides, if the number of overlaps at $R_t$ is larger than three and $R_t$ has not been removed by the non-maximum constraints, $R_t$ may be considered as a text candidate. However, if a text candidate has too large or too small aspect ratio, such candidate may be removed.

In the aforementioned case, the processor 120 may classify or allow other device to classify (i) the text candidate satisfying the predetermined condition as the strong text or the non-strong text by referring to the comparison result between the first threshold value and the first feature value of at least one pixel selected within the corresponding region including the text candidate satisfying the predetermined condition or the value converted from the first feature value and (ii) the text candidate classified as the non-strong text as the weak text or the non-text by referring to the comparison result between the second threshold value and the second feature value of at least one pixel selected within the corresponding region including the text candidate classified as the non-strong text or the value converted from the second feature value.

Again, by referring to FIG. 2, the processor 120 may perform or allow other device to perform text tracking by hysteresis at a step of S250. In other words, the processor 120 may determine whether to classify or allow other device to classify the weak text as the strong text by referring to information on the strong text and information on the weak text classified as shown above. More specifically, the processor 120 may classify or allow other device to classify the weak text as the strong text or a non-text by referring to the information related thereto.

As shown above, a text candidate classified as a strong text may have a high possibility of being determined as a real text. However, even a text candidate classified as a weak text may have a possibility of being determined as a real text. Accordingly, the present invention may regard the weak text as the strong text if the weak text has a characteristic similar to the strong text. In short, a text candidate classified as the weak text may be found from the neighbor of the strong text and the weak text may be dealt with a newly-added strong text if it has a characteristic similar to the strong text. This may allow a high recall rate to be achieved.

Information considered to determine whether the strong text and the weak text have any similar characteristics may include at least part of the information on locations, sizes, colors, and stroke widths of the strong text and the weak text.

Next, the processor 120 may group or allow other device to group strong texts classified in comparison to the first threshold value and those changed from the weak texts at a step of S260.

In addition, if a first strong text and a second strong text changed from a first weak text neighboring the first strong text are grouped and a second weak text is classified as a third strong text by referring to information on the second strong text and its neighboring second weak text, the processor 120 may group or allow other device to group the third strong text with the first and the second strong texts. As such, the present invention may perform the grouping by incorporating weak texts, whose characteristic is similar to a strong text among weak texts located near the strong text, into the strong text one by one.

Besides, the minimum-area encasing rectangle may be computed to provide compact bounding boxes as output. The smallest rectangle that encloses the grouped texts in the 2D image space may be calculated by using the 2D coordinates of character pixels.

FIGS. 5A to 5F are drawings showing intermediate results of text detections from example images by using a text detection technique in accordance with the present invention.

Figure 5A:
FIGS. 5A to 5F are drawings showing intermediate results of text detection from example images by using a text detection technique in accordance with the present invention.
Figure 5B:
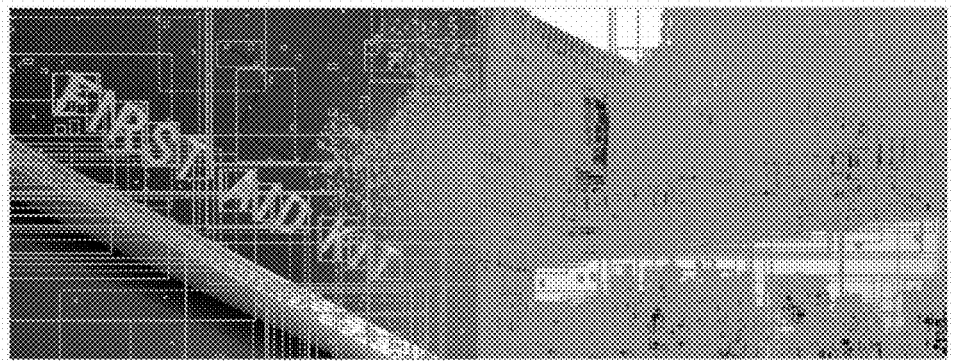
Figure 5C:
Figure 5D:
Figure 5E:
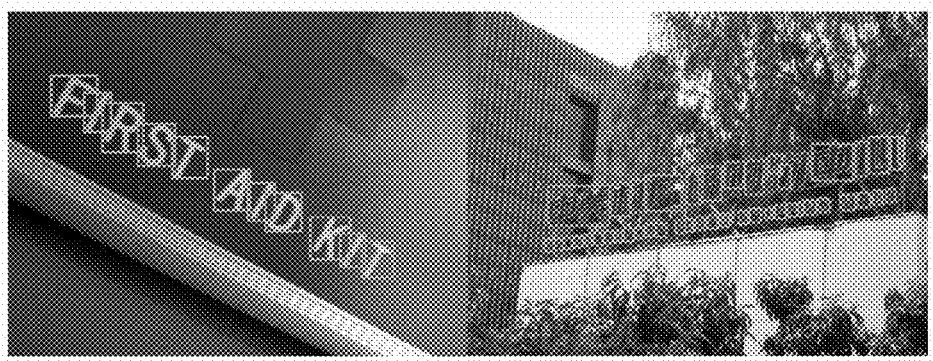
Figure 5F:

If an inputted image in FIG. 5A is acquired, FIG. 5B shows ERs selected after non-maximum suppression. FIG. 5C illustrates the result of the text candidates classified by using a high threshold, and it can be found that the relatively small number of text candidates is classified as strong texts. FIG. 5D shows the result of the text candidates classified as weak texts by using a low threshold, and it can be found that the relatively large number of text candidates is classified. FIG. 5E shows the result of the text tracking. As the result, many weak texts may be changed to strong texts. FIG. 5F shows a final result of the text grouping process.

The processor 120 performs a function of controlling the flow of data between the communication part 110 as explained above and the storage part 130 to be explained later. In short, the processor 120 controls the communication part 110, and the storage part 130 to perform their respective unique functions by controlling the flow of the data among components of the apparatus 100.

The processor 120 may include a hardware configuration that provides a micro processing unit (MPU), a central processing unit (CPU), cache memory, and data bus. Besides, it may further include a software configuration that provides an operating system and an application for performing a fixed purpose.

The storage part 130 has a configuration for storing a variety of data. In particular, the storage part 130 may store intermediate results as data produced at each step of detecting texts. Moreover, it may store software such as the operating system, or the application for performing the fixed purpose.

The inventor briefly explains the experimental results by implementing the aforementioned method and apparatus for detecting the texts as explained above.

FIGS. 6 to 8 are tables illustrating results of comparative experiments of performances between the present invention and other text detection techniques.

FIG. 6 is a table showing the result of comparing the present invention with the latest method for detecting text candidates for character-level recall on the ICDAR 2011 data set proposed in an article entitled "Scene text detection with robust character candidate extraction method" in Proc. ICDAR 2015 at pages 426-430 in 2015 by M.-C. Sung, B. Jun, H. Cho, and D. Kim.

As described in FIG. 6, it can be found that the present invention reduces the number of text candidates by using non-maximum suppression in the ER tree and has roughly ⅓ of the initial ERs by comparing with Sung et al. As the result of the present invention, it can be evaluated that while 90% or more of the less relevant text candidates are reduced, considerable recall rates are achieved.

FIG. 7 is a table showing the result of evaluating precision, recall, and harmonic mean of the present invention and another technologies for the ICDAR 2013 data set (D. Karatzas, F. Shafait, S. Uchida, M. Iwamura, S. R. Mestre, J. Mas, D. F. Mota, J. A. Almazan, L. P. de las Heras, et al. ICDAR 2013 robust reading competition. In Proc. ICDAR 2013, pages 1484-1493, 2013. 2, 3, 5, 6).

As described in FIG. 7, in comparison with the algorithms proposed in (i) an article entitled "Robust text detection in natural scene images" in IEEE Trans. Pattern Analysis Machine Intelligence, 36(5):970-983, May 2014 by X.-C. Yin, X. Yin, K. Huang, and H.-W. Hao, (ii) an article entitled "Scene text detection with robust character candidate extraction method" in Proc. ICDAR 2015, pages 426-430, 2015. 3, 4, 5, 6 by M.-C. Sung, B. Jun, H. Cho, and D. Kim, (iii) an article entitled "Text flow: A unified text detection system in natural scene images" in Proc. ICCV 2015 (to appear), 2015. 2, 6, 7 by S. Tian, Y. Pan, C. Huang, S. Lu, K. Yu, and C. L. Tan, (iv) an article entitled "Robust text detection in natural scene images" in IEEE Trans. Pattern Analysis Machine Intelligence, 36(5):970-983, May 2014. 2, 3, 4, 6, 7 by X.-C. Yin, X. Yin, K. Huang, and H.-W. Hao, (v) an article entitled "Real-time scene text localization and recognition" in Proc. CVPR 2012, pages 3538-3545, 2012. 1, 2, 6 by L. Neumann and J. Matas, (vi) an article entitled "Multi-orientation scene text detection with adaptive clustering" in IEEE Trans. Pattern Analysis Machine Intelligence, 37(9):1930-1937, September 2015. 2, 5, 6 by X. Yin, W. Pei, J. Zhang, and H. Hao, (vii) an article entitled "Scene text localization using gradient local correlation" in Proc. ICDAR 2013, pages 1380-1384, 2013. 6 by B. Bai, F. Yin, and C. L. Liu, and (viii) an article entitled "Scene text recognition using part-based tree-structured character detection" in Proc. CVPR 2013, pages 2961-2968, 2013. 6 by C. Shi, C. Wang, B. Xiao, Y. Zhang, S. Gao, and Z. Zhang, it can be found that the harmonic mean, etc. under the present invention are excellent.

FIG. 8 is a table showing the experimental results of the multi-language data set proposed in (i) an article entitled "A hybrid approach to detect and localize texts in natural scene images" in IEEE Trans. Image Processing, 20(3) at 800-813 in 2011 by Y.-F. Pan, X. Hou, and C.-L. Liu, (ii) an article entitled "Robust text detection in natural scene images" in IEEE Trans. Pattern Analysis Machine Intelligence, 36(5): 970-983, May 2014. 2, 3, 4, 6, 7 by X.-C. Yin, X. Yin, K. Huang, and H.-W. Hao and (iii) an article entitled "Text flow: A unified text detection system in natural scene images" in Proc. ICCV 2015 (to appear), 2015. 2, 6, 7 by S. Tian, Y. Pan, C. Huang, S. Lu, K. Yu, and C. L. Tan.

As stated in FIG. 8, it can be identified that the present invention shows improved recall, precision, and harmonic mean compared with other algorithms.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

In accordance with the present invention, the following effects can be found:

The present invention has an effect of providing a text detection technique with high recall rates while making optimal performance.

In addition, the present invention has an effect of achieving high recall rates upon text detection by classifying text candidates as strong texts, weak texts, and non-texts with multiple thresholds.

The present invention also has an effect of achieving high recall rates upon text detection by classifying text candidates as strong texts and weak texts and then changing the weak texts to the strong texts by referring to at least part of information on locations, sizes, colors, and stroke widths of the strong texts and the weak texts.

What is claimed is:

1. A method for detecting texts included in an image, comprising steps of:
    (a) an apparatus detecting or allowing other device to detect at least one text candidate in an inputted image, if acquired, by referring to feature values of pixels in the inputted image;
    (b) the apparatus classifying or allowing other device to classify (i) the detected text candidate as a strong text or a non-strong text by referring to a comparison result between a first threshold value and a first feature value of at least one pixel selected within a corresponding region where the detected text candidate is included or a value converted from the first feature value, and (ii) the text candidate classified as the non-strong text as a weak text or a non-text by referring to a comparison result between a second threshold value and a second feature value of at least one pixel selected within a corresponding region where the text candidate classified as the non-strong text is included or a value converted from the second feature value; and
    (c) the apparatus determining whether to classify or allow other device to classify the weak text as the strong text by referring to information on the strong text and information on the weak texts;
    wherein, at the step of (c), the apparatus reclassifies or allows other device to reclassify the weak text as strong text or non-text based on at least one degree of similarity between one or more respective characteristics of the weak text and the strong text.

2. The method of claim 1, after the step of (a), further comprising a step of: (a1) the apparatus identifying or allowing other device to identify at least one text candidate set including text candidates whose corresponding regions overlap by at least a certain percentage, and selecting or allowing other device to select the text candidate satisfying a predetermined condition among the identified text candidate set, and
    wherein, at the step of (b), the apparatus classifies or allows other device to classify (i) the text candidate satisfying the predetermined condition as the strong text or the non-strong text by referring to the comparison result between the first threshold value and the first feature value of at least one pixel selected within the corresponding region including the text candidate satisfying the predetermined condition or the value converted from the first feature value and (ii) the text candidate classified as the non-strong text as the weak text or the non-text by referring to the comparison result between the second threshold value and the second feature value of at least one pixel selected within the corresponding region including the text candidate classified as the non-strong text or the value converted from the second feature value.

3. The method of claim 1, wherein, at the step of (a), if feature values of all pixels included in a specific region in the inputted image are larger or smaller than those of an outer boundary area of the specific region, the apparatus detects or allows other device to detect the specific region as one of the text candidate.

4. The method of claim 3, wherein the apparatus detects or allows other device to detect the at least one text candidate by changing intensity level of the pixels of the specific region, and builds or allows other device to build a tree by allocating (i) a low-level text candidate whose intensity level in a specific region is relatively high and (ii) a text candidate whose intensity level is the highest among high-level text candidates, including a region of the low-level text candidate respectively, whose intensity level in the specific region is relatively low, to a child node and a parent node, respectively.

5. The method of claim 4, wherein, if there occurs no less than a certain percentage of an overlap between a first region where a text candidate corresponding to a particular node in the tree is included and a second region including the first region where the text candidate corresponding to the particular node is included and where a text candidate, with a relatively low intensity level of the pixel, corresponding to a parent node is included for no less than a specified number of times, the apparatus selects or allows other device to select a text candidate corresponding to a node whose variant of a corresponding region is small compared to its parent node; and at the step of (b), the apparatus classifies or allows other device to classify (i) the text candidate satisfying the predetermined condition as the strong text or the non-strong text in comparison to the first threshold value by referring to the comparison result between the first threshold value and the first feature value of at least one pixel selected within the corresponding region where the selected text candidate is included or the value converted from the first feature value, and (ii) the text candidate classified as the non-strong text as the weak text or the non-text by referring to the comparison result between the second threshold value and the second feature value of at least one pixel selected within the corresponding region where the text candidate classified as the non-strong text is included or the value converted from the second feature value.

6. The method of claim 1, further comprising a step of: (d) the apparatus grouping or allowing other device to group the strong text classified by comparing with the first threshold value and that changed from the weak text.

7. The method of claim 6, wherein, if a first strong text and a second strong text changed from a first weak text are grouped and a second weak text is classified as a third strong text by referring to information on the second strong text and the second weak text, the apparatus groups or allows other device to group the third strong text with the first strong text and the second strong text.

8. The method of claim 1, wherein, at the step of (b), if there is at least one middle threshold value between the first and the second threshold values, the apparatus classifies or allows other device to classify (i) a text candidate classified as the non-strong text as the strong text or a subordinated weak text by comparing with the middle threshold, and (ii) the subordinated weak text as the weak text or the non-text by comparing with the second threshold value.

9. The method of claim 1, wherein, at the step of (b), the apparatus performs or allows other device to perform said (i) and said (ii) mentioned above by referring to a value converted from the feature value of the pixel selected in the corresponding region where the detected text candidate is included, by using a mean local binary pattern (MLBP).

10. The method of claim 1, wherein, at the step of (b), the apparatus classifies or allows other device to classify the detected text candidate by using an AdaBoost-type classifier.

11. The method of claim 1, wherein, at the step of (c), the information on the strong text and the information on the weak text include at least part of information on the locations, sizes, colors, and stroke widths of the strong text and the weak text.

12. The method of claim 1, wherein the corresponding region where the detected text candidate is included is a bounding box region including the detected text candidate with an extra margin minimized.

13. An apparatus for detecting texts included in an image, comprising:
  a communication part for acquiring an inputted image; and
  a processor for (i) detecting or allowing other device to detect at least one text candidate in an inputted image, if acquired, by referring to feature values of pixels in the inputted image; (ii) classifying or allowing other device to classify the detected text candidate as a strong text or a non-strong text by referring to a comparison result between a first threshold value and a first feature value of at least one pixel selected within a corresponding region where the detected text candidate is included or a value converted from the first feature value, and classifying or allowing other device to classify the text candidate classified as the non-strong text as a weak text or a non-text by referring to a comparison result between a second threshold value and a second feature value of at least one pixel selected within a corresponding region where the text candidate classified as the non-strong text is included or a value converted from the second feature value; and (iii) determining whether to classify or allow other device to classify the weak text as the strong text by referring to information on the strong text and information on the weak text;
  wherein, at the step of (iii), reclassifying or allowing other device to reclassify the weak text as strong text or non-text based on at least one degree of similarity between one or more respective characteristics of the weak text and the strong text.

14. The apparatus of claim 13, wherein, after the process of (i), the processor identifies or allows other device to identify at least one text candidate set including text candidates whose corresponding regions overlap by at least a certain percentage, and selects or allows other device to select the text candidate satisfying a predetermined condition among the identified text candidate set, and
  wherein the processor classifies or allows other device to classify (i) the text candidate satisfying the predetermined condition as the strong text or the non-strong text by referring to the comparison result between the first threshold value and the first feature value of at least one pixel selected within the corresponding region including the text candidate satisfying the predetermined condition or the value converted from the first feature value and (ii) the text candidate classified as the non-strong text as the weak text or the non-text by referring to the comparison result between the second threshold value and the second feature value of at least one pixel selected within the corresponding region including the text candidate classified as the non-strong text or the value converted from the second feature value.

15. The apparatus of claim 13, wherein, at the process of (i), if feature values of all pixels included in a specific region in the inputted image are larger or smaller than those of an outer boundary area of the specific region, the processor detects or allows other device to detect the specific region as one of the text candidate.

16. The apparatus of claim 15, wherein the processor detects or allows other device to detect the at least one text candidate by changing intensity level of the pixels of the specific region, and builds or allows other device to build a tree by allocating (i) a low-level text candidate whose intensity level in a specific region is relatively high and (ii) a text candidate whose intensity level is the highest among high-level text candidates, including a region of the low-level text candidate respectively, whose intensity level in the specific region is relatively low, to a child node and a parent node, respectively.

17. The apparatus of claim 16, wherein, if there occurs no less than a certain percentage of an overlap between a first region where a text candidate corresponding to a particular node in the tree is included and a second region including the first region where the text candidate corresponding to the particular node is included and where a text candidate, with a relatively low intensity level of the pixel, corresponding to a parent node is included for no less than a specified number of times, the processor selects or allows other device to select a text candidate corresponding to a node whose variant of a corresponding region is small compared to its parent node; and the processor classifies or allows other device to classify (i) the text candidate satisfying the predetermined condition as the strong text or the non-strong text in comparison to the first threshold value by referring to the comparison result between the first threshold value and the first feature value of at least one pixel selected within the corresponding region where the selected text candidate is included or the value converted from the first feature value, and (ii) the text candidate classified as the non-strong text as the weak text or the non-text by referring to the comparison result between the second threshold value and the second feature value of at least one pixel selected within the corresponding region where the text candidate classified as the non-strong text is included or the value converted from the second feature value.

18. The apparatus of claim 13, wherein, after the process of (iii), the processor groups or allows other device to group the strong text classified by comparing with the first threshold value and that changed from the weak text.

19. The apparatus of claim 18, wherein, if a first strong text and a second strong text changed from a first weak text are grouped and a second weak text is classified as a third strong text by referring to information on the second strong text and the second weak text, the processor groups or allows other device to group the third strong text with the first strong text and the second strong text.

20. The apparatus of claim 13, wherein, at the process of (ii), if there is at least one middle threshold value between the first and the second threshold values, the processor classifies or allows other device to classify (ii-1) a text candidate classified as the non-strong text as the strong text or a subordinated weak text by comparing with the middle threshold, and (ii-2) the subordinated weak text as the weak text or the non-text by comparing with the second threshold value.

21. The apparatus of claim 13, wherein, at the process of (ii), the processor performs or allows other device to perform the classifications by referring to a value converted from the feature value of the pixel selected in the corresponding region where the detected text candidate is included, by using a mean local binary pattern (MLBP).

22. The apparatus of claim 13, wherein, at the process of (ii), the processor classifies or allows other device to classify the detected text candidate by using an AdaBoost-type classifier.

23. The apparatus of claim 13, wherein, at the process of (iii), the information on the strong text and the information on the weak text include at least part of information on the locations, sizes, colors, and stroke widths of the strong text and the weak text.

24. The apparatus of claim 13, wherein the corresponding region where the detected text candidate is included is a bounding box region including the detected text candidate with an extra margin minimized.

* * * * *